Oct. 7, 1941.                L. A. DUNAJEFF                2,258,281
                              AERIAL TORPEDO
                           Filed May 20, 1938                3 Sheets-Sheet 1
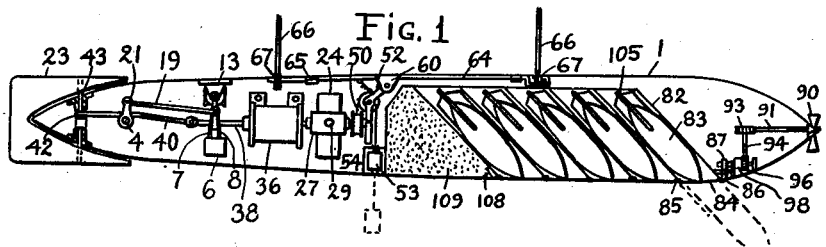
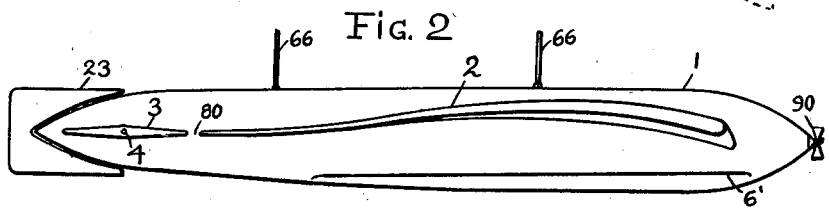
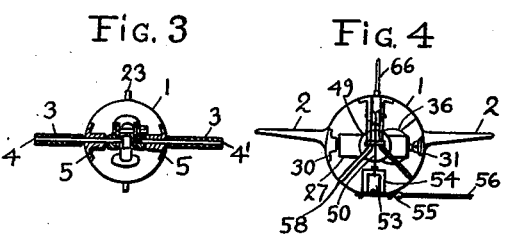  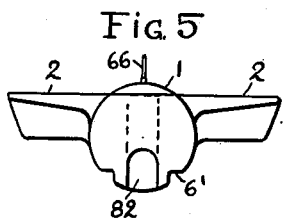
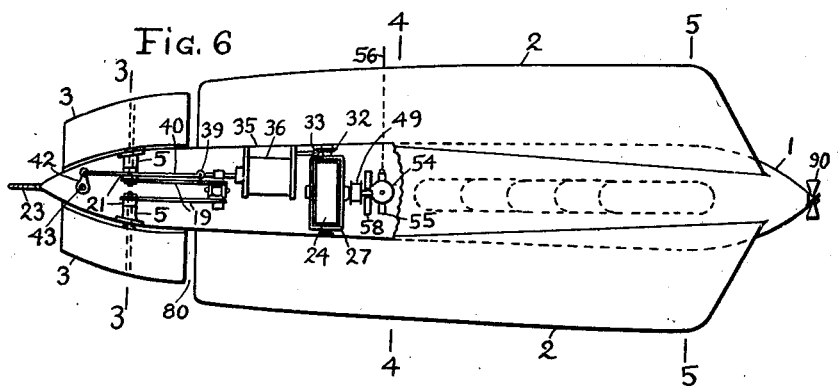
LEONID A. DUNAJEFF
INVENTOR.
BY John P. Nixonow
ATTORNEY.

Oct. 7, 1941.  L. A. DUNAJEFF  2,258,281
AERIAL TORPEDO
Filed May 20, 1938  3 Sheets-Sheet 2
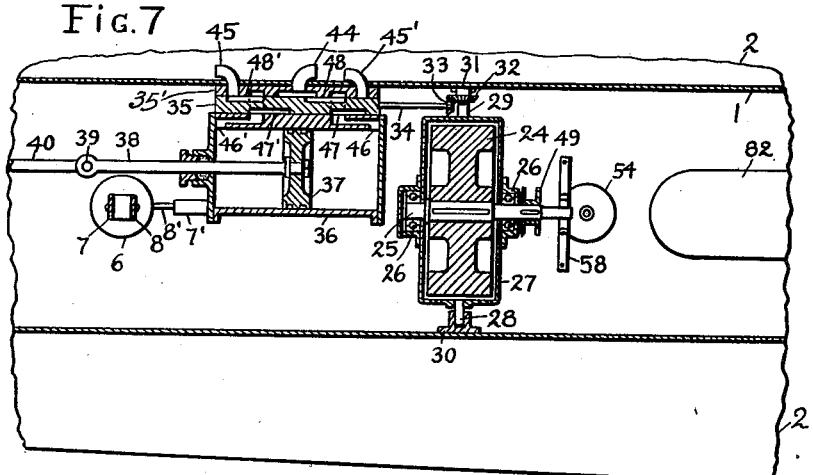
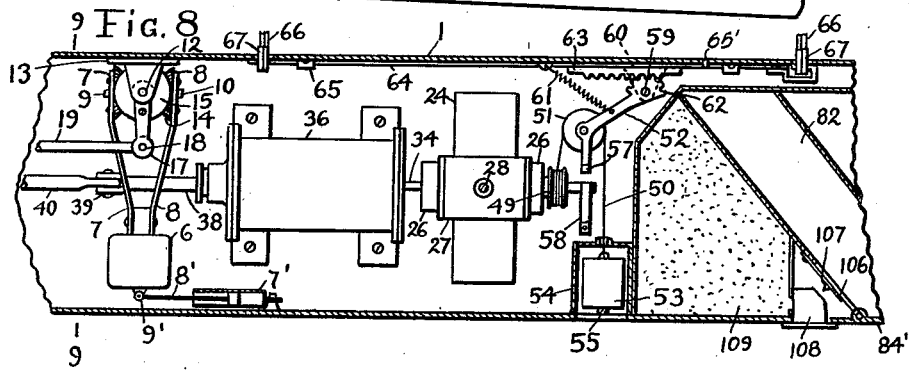
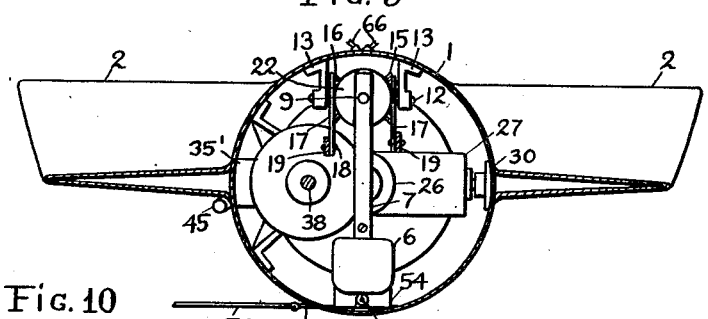
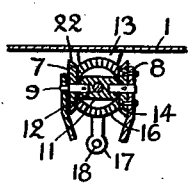
LEONID A. DUNAJEFF
INVENTOR.
BY John P. Nikonow
ATTORNEY.

Oct. 7, 1941. L. A. DUNAJEFF 2,258,281
AERIAL TORPEDO
Filed May 20, 1938 3 Sheets-Sheet 3
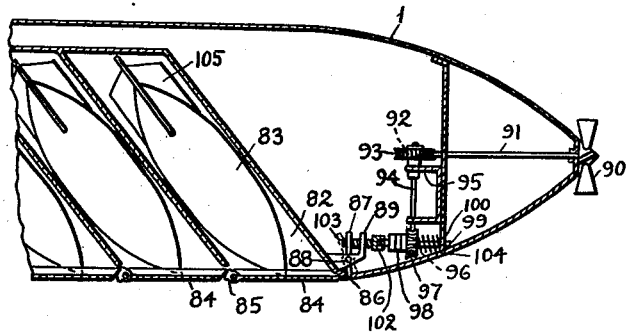
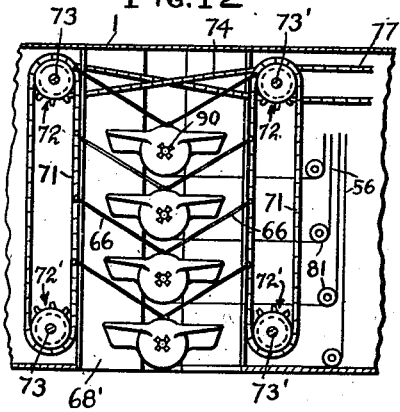 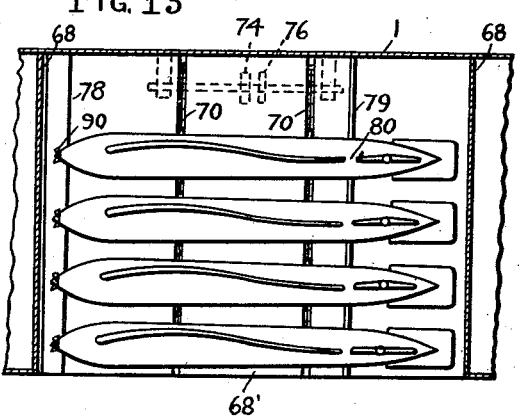
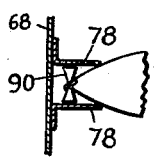 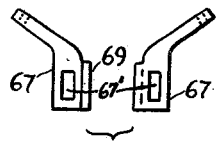
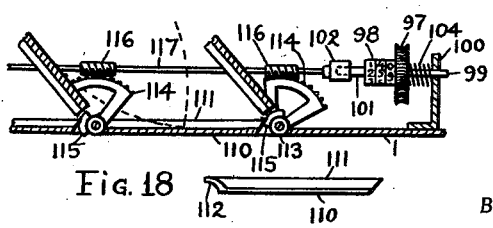
Leonid A. Dunajeff
INVENTOR.
BY John P. Nixonov
ATTORNEY.

Patented Oct. 7, 1941

2,258,281

UNITED STATES PATENT OFFICE 2,258,281

AERIAL TORPEDO

Leonid A. Dunajeff, New York, N. Y., assignor to Commercial Ingredients Corporation, New York, N. Y., a corporation of New York Application May 20, 1938, Serial No. 209,898

3 Claims. (Cl. 89—1.5)

This invention relates to aerial torpedoes and to methods of launching them from airplanes.

Ordinary aerial torpedoes or bombs, when discharged from an airplane, drop to the ground by gravity, describing a parabolic trajectory on a rather short distance so that the airplane must practically fly over the objects to be bombed before it can turn around and fly back. The airplane under such conditions is open to the attack by the enemy antiaircraft guns and his pursuit planes.

My invention has for its object therefore to provide a method and means for bombing distant objects by bombs, singly or in groups, transported on specially constructed automatic aerial gliding carriers launched from airplanes flying at high altitudes and at a considerable distance from the objects. My carrier for this purpose is made so that it will glide upon release from an airplane at a constant predetermined angle of descent. By selecting a suitable angle of descent, it is possible to control the distance at which the carrier will reach its objective for a given altitude of the airplane and its speed, taking into consideration, of course, the direction and velocity of the wind. I have found that for ordinary airplane speeds it is possible to make such a gliding carrier with relatively narrow wing portions so that it can be conveniently held in the fuselage of an airplane, to be launched at a desired moment. The carrier is made not only as a means for delivering bombs, but it also explodes itself upon fulfilling its mission and therefore, for convenience, it will be hereinafter called "aerial torpedo" or "torpedo."

Another object of my invention is to provide means to keep the torpedo during its flight on the originally given course. For this purpose I provide the torpedo with a gyroscopic mechanism connected with vertical rudders in such a manner that any deviation of the torpedo from the given direction will cause the gyroscope to operate the rudder thereby correcting the deviation.

Another object of my invention is to provide means to spin the gyroscope when the torpedo is ready to be launched. I accomplish this by providing a weight attached to one end of a flexible cord wound on a pulley on the extension of the gyroscope shaft. By releasing the weight, it is allowed to fall from the torpedo, carrying the cord and imparting rotation to the gyroscope until the cord is completely unwound from the pulley and falls away together with the weight. In order to release the torpedo at the exact moment when the cord is unwound, I provide a mechanism controlled by the tension of the cord so that when the tension is released, the mechanism releases the torpedo for its flight.

Another object of my invention is to provide an arrangement for supporting a number of my torpedoes in the fuselage of an airplane with a manually operable conveying mechanism for successively bringing the torpedoes into the launching position at the bottom of the fuselage. The conveying mechanism can be also made to be operated by an electric motor or other suitable source of power. Still another object of my invention is to provide a mechanism for releasing or launching (dropping) torpedoes one after another from the airplane. The launching or dropping mechanism also includes means for spinning the gyroscope.

My invention includes therefore a method for bombarding distant objectives by delivering a plurality of bombs on an aerial carrier.

My invention is more fully described in the accompanying specification and drawings in which—

Fig. 1 is a sectional elevation of the torpedo.

Fig. 2 is an elevational outside view of the same.

Fig. 3 is a sectional view taken on the line 3—3 of Fig. 6.

Fig. 4 is a sectional view taken on the line 4—4 of Fig. 6.

Fig. 5 is a sectional view taken on the line 5—5 of Fig. 6.

Fig. 6 is a top plan view of the torpedo partly in section.

Fig. 7 is a sectional detail view of a gyroscope with the air cylinder.

Fig. 8 is a fractional vertical sectional view of the middle portion of the torpedo showing in detail the pendulum and the outside view of the gyroscope with the air cylinder.

Fig. 9 is a sectional view taken on the line 9—9 of Fig. 8.

Fig. 10 is a fractional sectional view of the pendulum gears.

Fig. 11 is a detail view of a bomb releasing mechanism.

Fig. 12 is a fractional transverse sectional view of an arrangement for supporting a number of torpedoes in an airplane.

Fig. 13 is a fractional longitudinal sectional view of the same.

Fig. 14 is a detail view of a guiding device for the front portions of the torpedoes.

Figs. 15 and 16 are detail views of interlocking rings on the ends of the torpedo supporting links.

Fig. 17 is a detail view of a modified bomb releasing mechanism.

Fig. 18 is a detail view of a cover for the bomb compartment.

My torpedo represents a miniature airplane or glider, having an elongated streamlined body 1 and a pair of laterally extending wings 2. In view of the fact that the torpedo at the moment of its release is already moving through space at the high speed of the carrier airplane, and that after release it must glide toward the ground in a more or less rapid descent, it follows that the relative wing span may be made considerably smaller than would be necessary to provide for an airplane which must start its flight from the ground. The over-all width of the torpedo can be reduced, therefore, so as to facilitate its storing in the fuselage of the carrier airplane. Approximate proportions of the wings for ordinary conditions are shown in Fig. 6. The wings must be designed in accordance with the weight of the torpedo, size of the body, speed of the airplane, and the desired angle of descent, or, in other words, the desired distance of flight from a given elevation. Additional lifting surface may be provided by forming shoulders 6' with grooves at the sides of the body 1.

The torpedo must be entirely automatic in its flight and, therefore, it must be provided with an automatic stabilizing apparatus for maintaining lateral stability and for keeping the desired angle of incidence in gliding. For this purpose elevators or horizontal rudders 3 are provided mounted on shafts 4 and 4' journaled in bearings 5. The elevators are operated by a pendulum 6 shown in detail in Figs. 8, 9 and 10. The pendulum is suspended on bars 7 and 8 rotatively mounted on stub shafts 9 and 10 fitted in a block 11 on a shaft 12 which is supported in brackets 13. The bar 8 is attached to a bevel gear 14 in mesh with bevel gears 15 and 16 rotatively mounted on the shaft 12 and provided with arms 17. The latter are pivotally connected at 18 to links 19, whose other ends are pivoted at 20 to arms 21 mounted on the inner ends of the shafts 4. A gear 22 is rotating on the shaft 9 and serves only to balance the pressure between the other gears. This arrangement forms a differential gearing permitting the pendulum to oscillate in all directions and at the same time providing for the proper operation of the elevators so as to correct lateral and longitudinal deviations of the torpedo in flight.

As may be seen from the drawings, the pendulum, if deflected longitudinally of the body 1, rotates both gears 9 and 10 in the same direction, thereby turning both elevators up or down so as to correct the angle of incidence of the torpedo in flight. A transverse inclination of the pendulum, caused by lateral rotation of the torpedo, will cause the gears 9 and 10 to rotate in opposite directions, thereby causing the elevators to turn so as to reestablish the correct stable lateral position of the wings. For retarding the oscillations of the pendulum, a dash pot 7' is provided with a plunger 8' pivotally connected to the pendulum at 9'.

The torpedo must automatically maintain its direction of flight. This is accomplished by providing the torpedo with a vertical rudder 23 controlled by a gyroscope 24. The latter is mounted on a shaft 25 journaled in ball bearings 26 in a gimbel ring 27 rotatively supported in trunnion shafts 28 and 29. Bearings 30 and 31 for these shafts are mounted on the walls of the torpedo.

The gyroscope controls the operation of an air motor which operates the rudder. For this purpose, the shaft 29 has a bevel gear 32 in mesh with a bevel pinion 33 on a shaft 34 extending from a rotary valve 35 in a casing 35' at the side of an air cylinder 36. A piston 37 has a rod 38 pivotally connected at 39 to one end of a link 40 whose other end is pivoted at 42 to an arm keyed on a shaft 43 of the rudder 23. The piston is moved by compressed air which is delivered by a Pitot tube 44 directed against the air flow in flight (Fig. 7). The exhaust air is obtained by suction Pitot tubes 45 and 45' directed rearward in flight. As is shown in Fig. 7, the valve in one position admits the compressed air into the right side of the cylinder 36 through a port 46 and passages 47 and 48 in the valve. The left side of the cylinder is then connected with the suction Pitot tube 45 through passages 47' and 48' and port 46'. The operation is reversed when the valve is turned in the other direction from the neutral position. It should be noted that it is preferable to place the passages 47 and 47' at a small peripheral distance from the passages 48 and 48' in order to obtain the reversal of the piston for small angular movements of the valve or for small angles of rotation of the ring 27. With such an arrangement it is possible to obtain a very sensitive and effective control of the rudder with a relatively small gyroscope, this arrangement being therefore preferable to the direct connection of the gyroscope with the rudder. The axis of rotation or shaft 25 is supported horizontally or coaxially with the torpedo, the gimbel frame being also mounted on a horizontal axis transversely to the shaft 25. With this arrangement any deviation to the left or right will cause the axis of gyroscope to turn in the vertical plane thereby causing rotation of the bevel gears 32 and 33.

In order to impart rotation to the gyroscope, the end of its shaft 25 is provided with a spool or pulley 49 on which a cord or cable 50 is wound, the end of the cord being held in place only by the subsequent turns so that the cord becomes free when unwound from the pulley. The cord passes from the pulley to an idler sheave 51 supported in a bracket 52, the end of the cord being attached to a weight 53 in a well 54 open at the bottom. The weight rests on a bar 55 slidably supported at the bottom of the well and provided with a cord or cable 56 extending to the outside of the torpedo for manual operation. By pulling on the cable, the bar is withdrawn from the well and the weight is allowed to fall out carrying the cord 50 with it, the cord rotating the shaft 25 with the gyroscope. It is important to spin the gyroscope in its correct operative position, and for this purpose the end of the shaft 25 is retained in the correct horizontal position by a bar 57 on the lower end of the bracket 52 adapted to rest against the ends of supports 58 attached to the walls of the body 1. The upper end of the bracket 52 is pivoted on a shaft 59 fitted in brackets 60 mounted under the top wall of the body 1. A retrieving spring 61 tends to raise the bracket with the pulley away from the supports 58. The bracket is retained in contact with the supports by the downward pull on the cord 50 exerted by the falling weight 53, the gyroscope remaining in the horizontal position by reason of the end of the shaft 25 being held by the bar 57. The cord, when completely unwound, falls away with the weight, and the bracket is raised by the spring 61 releasing the shaft 25 for free movement in the vertical plane. In order to prevent an accidental release of the locking bar 64, it is held in the locking position by a shearing pin 65', the bar 57 being slightly raised above the brackets 58 so that the pin can be broken by the pull on the cord when the weight is released.

The rotation thus imparted to the gyroscope must be sufficient to last during the flight of the torpedo, therefore, it is important to launch the latter at the moment when the spinning operation is completed and the cord is carried away by the weight. For this purpose, the bracket 52 has a gear sector 62 in mesh with a rack 63 on a bar 64 slidably supported in cleats 65 mounted on the under side of the roof portion of the body 1. The bar, when moved by the gear sector, releases the torpedo from supporting links or cables 66, the ends of the links having interlocking plates 67 with holes 67' engaged by the ends of the bar 64 as shown in Fig. 8. The links extend at an angle from the opposite sides of a specially provided well 68 in the fuselage of an airplane, the plates 67 entering corresponding slots in the roof of the body 1. Each plate has a hook 69 at the end engaging the opposite edge of the other plates so that the plates remain locked together until the torpedo falls away from the well, when the plates become separated, permitting the links to drop aside. The links pass through vertical slots 70 in the walls 68 of the well 68' and are pivotally attached to endless chains 71 mounted on sprockets 72 and 72'. Shafts 73 and 73' of the sprockets are interconnected by a chain 74 engaging sprockets on the shafts 73 and 73' so that both chains 71 are moved at the same time when one of the shafts is rotated. The shaft 73' has a sprocket 76 with a chain 77 extending outside the well to a point where it can be manually operated as, for instance, by a handle on the end sprocket (not shown). The well is made sufficiently deep so that several torpedoes can be placed inside, one above the other suspended at proper distances on the links 66 from the chains. The angular arrangement of the links prevents the torpedoes from moving in lateral directions. To prevent their longitudinal movement, the noses of the torpedoes slide between vertical guiding plates 78 abutting the curved walls of the torpedoes beyond vanes 90 and spaced so that the vanes are prevented from rotation while being free to slide along the guides as shown in Fig. 14 in plan view. The tails of the torpedoes are guided by plates 79 entering between the ends of the wings and the front edges of the elevators where slots 80 are formed.

For launching the torpedo it is lowered to the bottom of the well and the weight 53 is released by pulling on the cord 56 and removing the retaining bar 55. The cords 56 pass over pulleys 81 into the control cabin in the airplane, the pulleys being located at a sufficient distance from the torpedoes so as to be operative for different positions of the torpedoes in the well.

The front or middle portion of the body 1 has a number of cells 82 preferably inclined forward for bombs 83 which are retained in their positions by hinged doors 84. The doors are interlocked together so that each succeeding door is held in place by a cam 85 on the rear end of the preceding door as shown in Fig. 11. The front door is held by a hook 86 on the end of a lever 87 pivoted at 88 in a bracket 89. With this arrangement the bombs are successively released one after another when the first door is opened by turning the hook 86. A mechanism is provided for releasing the first bomb after the torpedo has reached its destination in flight. For this purpose, a vane 90 is provided of an ordinary type, such as are used for arming aerial torpedoes in front mounted on the end of a shaft 91 as shown in Figs. 1 and 11. The other end of the shaft has a worm 92 in mesh with a worm gear 93 on a vertical shaft 94 journaled in a bracket 95 and having a worm 96 in mesh with a worm gear 97. The latter is mounted on a first wheel of a revolution counter 98 on a shaft 99 supported in a bracket 100. The last wheel of the counter is connected by a shaft 101 with a sliding coupling 102 on the end of a screw 103 threaded in the end of the lever 87. The counter is made so that when the wheels reach the last position indicated by the figures 999 . . ., they will be locked together and the screw 103 will turn at the same speed as the gear 97, moving the lever and releasing the first door 84. The counter can be removed for setting the wheels for the desired distance of flight by shifting the assembly to the right against the tension of a spring 104 thereby releasing the end of the shaft 101 from the coupling 102. The counter can be then removed from the body 1 through a suitable opening (not shown).

The bombs 83 may be of any suitable type, high explosive, shrapnel or incendiary, provided if desired with gliding tail plates 105. The latter may be curved in different directions in order to cause the bombs to fly in different directions so as to scatter over a more or less wide area.

In order to explode and destroy the torpedo when the last bomb is discharged, the last door 84', when opened, snaps a spring 106 with a firing pin 107 which strikes a detonator 108, exploding a charge of an explosive material 109.

A modified construction of the door opening mechanism is shown in Figs. 17 and 18. Each door 110 is provided with ribs 111 for guiding the nose of the bomb when the door is opened, the rear end of the door having a hook 112 engaging a shaft 113 when the door is closed, but permitting the door to fall away when opened so as not to obstruct the flight of the next released bomb. The shafts 113 have gear sectors 114 with cams 115 engaging the end points of the ribs 111, the sectors being engaged by worms 116 on a shaft 117 operated by the counter 98. The sectors and cams are set differently at successively increasing angles so that the doors are released one after another after predetermined periods of time.

It is understood that the described embodiment represents only an example of a construction in accordance with my invention and it may be further modified in various mechanical arrangements and details within the scope of the appended claims.

I claim as my invention:

1. A mechanism for launching aerial torpedoes from an airplane, comprising a well having substantially vertical walls in the bottom part of an airplane, hinged links extending from opposite walls of the well downward to the upper side of a torpedo in the well, rings at the ends of the links, the rings of each pair of opposite links joined together and engaging a retaining member in the torpedo, and means to release the rings from the retaining member, thereby releasing the torpedo from the well.

2. A mechanism for launching aerial torpedoes from an airplane, comprising a well having substantially vertical walls at the bottom of the fuselage of an airplane, means to guide torpedoes in the well, hinged links extending in pairs from the opposite walls of the well to the upper sides of the torpedoes, one pair at the front and one at the rear for every torpedo, the ends of the links engaging portions of the torpedoes, and means to release the torpedoes successively by releasing the ends of the links.

3. A mechanism for launching aerial torpedoes from an airplane, comprising a well at the bottom of the fuselage of an airplane, means to guide torpedoes between the walls of the well, hinged links extending from the side walls to the upper sides of the torpedoes, the ends of the opposite links joined together and engaging portions of the torpedoes, and means to release the torpedoes by releasing the links, the released links hanging vertically along the walls without obstructing the passing of the following torpedoes.

LEONID A. DUNAJEFF.